Jan. 16, 1951  L. S. TREESE  2,538,218
ADJUSTABLE SPEED INDICATOR FOR MOTOR VEHICLES
Filed April 14, 1947  2 Sheets-Sheet 1
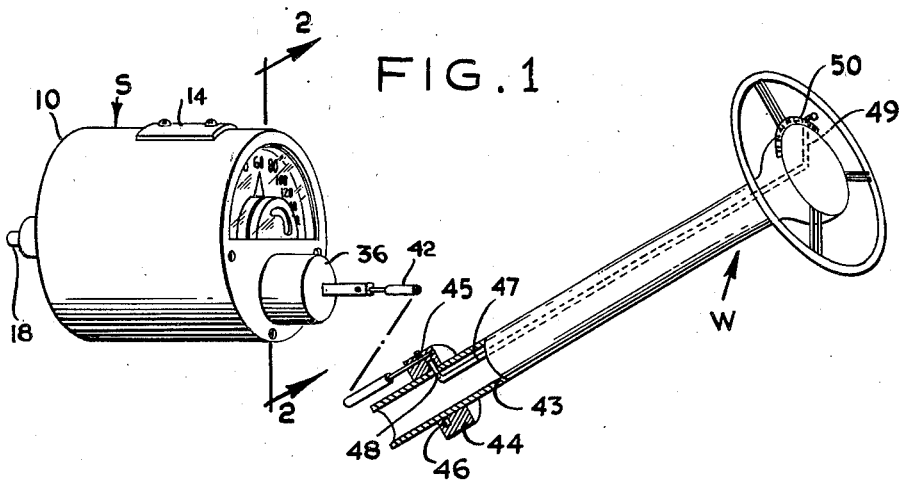
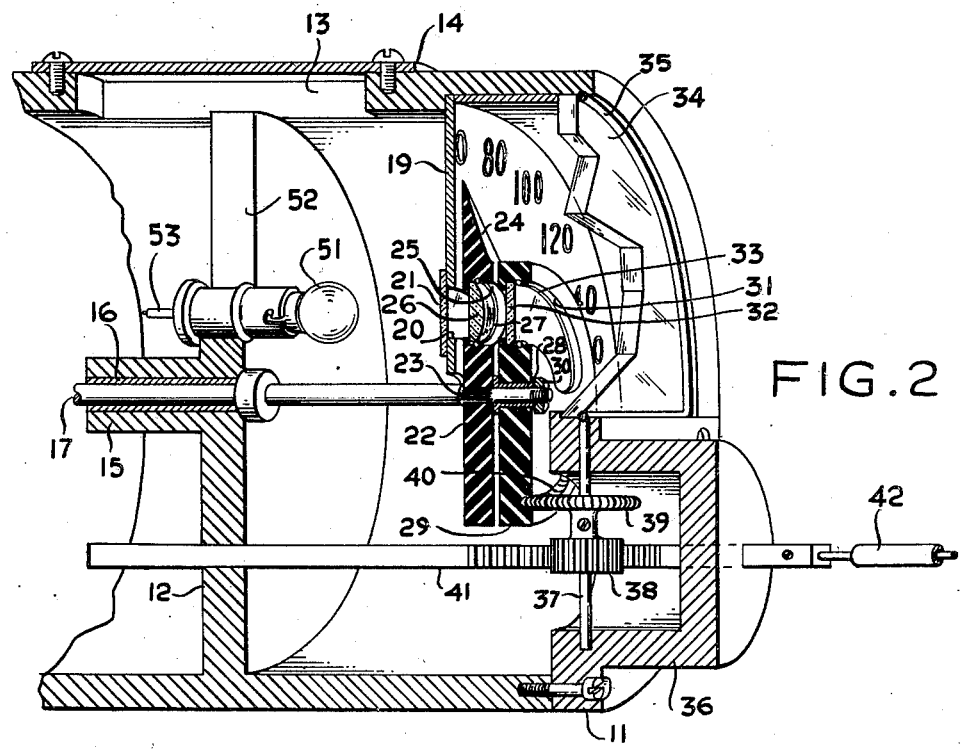
INVENTOR
LEE S. TREESE
BY
Toulmin & Toulmin
ATTORNEYS Jan. 16, 1951 L. S. TREESE 2,538,218
ADJUSTABLE SPEED INDICATOR FOR MOTOR VEHICLES
Filed April 14, 1947 2 Sheets-Sheet 2

INVENTOR
LEE S. TREESE
BY
Toulmin & Toulmin
ATTORNEYS

Patented Jan. 16, 1951

2,538,218

UNITED STATES PATENT OFFICE 2,538,218

ADJUSTABLE SPEED INDICATOR FOR MOTOR VEHICLES

Lee S. Treese, Dearborn, Mich., assignor to Tucker Corporation, Chicago, Ill., a corporation of Delaware Application April 14, 1947, Serial No. 741,211

5 Claims. (Cl. 116—129)

The present invention relates to the broad field of devices which indicate the speed at which a motor vehicle is driven, and is concerned primarily with a novel mechanism designed to noticeably call attention to the fact that a certain predetermined speed is being exceeded.

At the present time it is the common and conventional practice in the automotive industry to provide an automobile with a speedometer which indicates the speed at which the automobile is being driven. If a driver pays close attention to the speedometer during the driving operation he will, of course, be enabled to remain within the lawful speed limits of any zone through which he may be passing. However, as a practical matter the ordinary driver either will not or cannot devote careful attention to this factor. As a result, there are many occasions on which the driver unconsciously exceeds the speed limit.

With these conditions in mind, the present invention has in view as its primal object the provision of a speedometer together with mechanism that is associated therewith which will noticeably call the driver's attention to the fact that a certain predetermined speed is being exceeded.

More in detail, the invention has as an object the provision of mechanism which is adapted to be operatively associated with the speedometer and which may be adjusted for any desired speed. When this speed is exceeded, the mechanism operates to flash on a signal light so as to call the driver's attention to this condition.

Following certain recent trends in automotive design, it has been proposed to mount the speedometer of the car in the front and at the top of the hood or cowl, at the location which generally had been occupied by the engine temperature gauge. This practice was adopted because it is believed that with a speedometer so located it may be viewed by the driver with a minimum of distraction or deviation from the normal field of vision of the driving operation.

The present invention has as a further object the provision of speed indicator mechanism of the character above noted which is adapted for use with a speedometer that is located at the front and top of the hood or cowl.

In carrying out this idea in a practical embodiment, an operating member is located on the steering wheel of the car. This lever is readily accessible to the driver and is availed of as a means to adjust the speed at which the indicator will flash its signal. Operative connections between this lever and the speed indicating mechanism proper are provided.

In providing a speed indicator of the type aforesaid, it is highly desirable to employ a signal of a very noticeable type, thus a further object of the invention is to provide, in a mechanism of this type, a colored light bulb together with a flasher circuit to cause the bulb to flash on and off intermittently. Such a flash arrangement will be more effective in attracting the driver's attention than would a light which remains on constantly.

Still another object of the invention is to provide, in an automobile speedometer, a light for illuminating the speedometer under ordinary night driving conditions, and a second flasher light of a different color which flashes on intermittently when a certain predetermined speed is exceeded.

Various other more detailed objects and advantages of the invention such as arise in connection with carrying out the above noted ideas in a practical embodiment, will in part become apparent and in part be hereinafter stated as the description of the invention proceeds.

The invention, therefore, comprises a speed indicator mechanism adapted to be operatively associated with a speedometer and which includes a remotely controlled adjustable element for setting the mechanism for any desired speed. The speed indicator includes a flash bulb which is brought into effect when a certain predetermined speed is exceeded.

For a full and more complete understanding of the invention, reference may be had to the following description and accompanying drawings wherein:

Figure 1 is a perspective view, somewhat diagrammatic, showing a speedometer and a steering gear to which the speed indicator of this invention has been applied;

Figure 2 is another perspective taken on an enlarged scale and showing the speedometer and associated mechanism in section;

Figure 4:
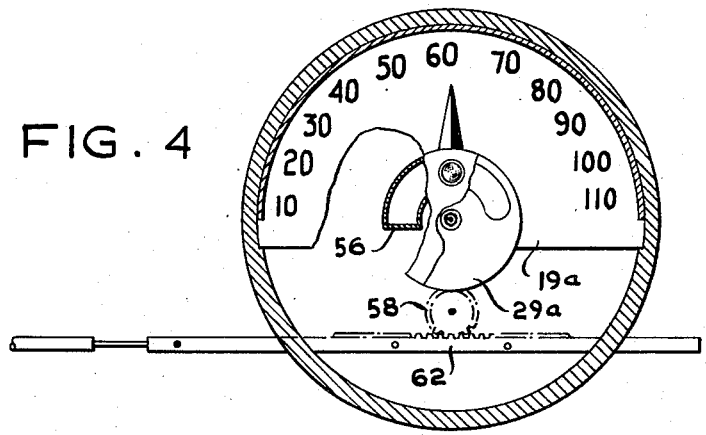
Figure 4 is a view in front elevation of the modification shown in Figure 3, with parts being broken away and shown in section.

Referring now to the drawings wherein like reference characters denote corresponding parts, and first more particularly to Figures 1 and 2, the speedometer is identified in its entirety by the reference character S, while the steering mechanism for an automobile is indicated at W, While it is entirely practical to locate the speedometer S at any location on the car which is desired, the invention has particularly in mind an arrangement in which the speedometer S is mounted at the front and top of the hood or cowl, because in this position it may be readily viewed by the driver while driving and with a minimum distraction from the driving operation.

The speedometer S will include not only the usual speedometer mechanism for indicating to the driver the speed at which the car is driven, but also the mechanism which is provided by this invention, which will noticeably call attention to the fact that a certain predetermined speed is being exceeded.

The speedometer S comprises a cylindrical casing 10 which carries at the front an end closure designated 11. Within the casing 10 there is a partition 12, and above this partition the casing 10 is formed with an opening 13 which normally is closed by a removable cover plate 14.

The partition 12 has integrally formed therewith and substantially centrally thereof, a sleeve 15 which carries a bearing 16. A shaft 17 is journaled in this bearing and is operatively connected to the speedometer mechanism which is located in the rear portion of the casing 10. This mechanism is not herein illustrated because speedometer mechanism of this type is now well known to the public and purchasable as such. The particular speedometer mechanism employed is not a part of this invention as any accepted device of this type may be used. As shown in Figure 1, a flexible shaft 18 extends from the rear of the casing in which it is connected to the speedometer mechanism and thence to a moving part of the vehicle such as a wheel.

Fixedly mounted within the front portion of the casing 10 is a gauge face 19 that is suitably calibrated to ordinary driving speeds. This gauge face 19 may be of an opaque or semi-transparent material such as a plastic. Adjacent to the center which defines its peripheral curvature, the face 19 is formed with an arcuate slot 20 which may be covered by a diffusing glass 21. The shaft 17 extends forwardly of the partition 12 and just in front of the gauge face 19 carries an index arm 22, which is keyed thereto as shown at 23. The index arm 22 in turn carries a pointer 24 which cooperates with the calibrations on the gauge face 19.

The index arm 22 may be of any appropriate material, although the invention has particularly in mind the use of a plastic which is fairly thick and opaque so as to prevent the transmission of light therethrough. This index arm 22 is formed with an opening at 25 immediately in front of the slot 20. A lens 26 may be positioned in this opening and is detachably held therein by a snap ring 27.

As above mentioned, the index arm 22 is keyed to the shaft 17. In front of the dial 22 the shaft 17 carries a bearing sleeve 28 on which is journaled a rotatable disc 29. A nut shown at 30 maintains the assembled relation of the dial 22 and disc 29 on the shaft 17.

The disc 29 is formed with an arcuate slot 31 which corresponds in position and curvature to the slot 20. A glass 32 may be positioned in this slot and detachably secured therein by a snap fastener 33. At this point it is well to note that the opening 25 is at all times in alignment with the opening 20. However, the arcuate slot 31 has a limited extent. When it is not in alignment with the opening 20 no light can emanate therethrough. When it is in alignment light from the interior of the casing 10 will be transmitted as later explained and will pass through the slot 20, opening 25 and slot 31.

The end closure 11 carries in its upper half a glass panel 34 which may be detachably held in position by a spring ring 35. Beneath the glass panel 34 the end closure 11 is formed with a cup shaped member 36. A vertical shaft 37 is journaled in the walls of the cup shaped member 36 and drivably carries a pinion 38. A gear 39 is also drivably carried by the shaft 37 and meshes with a series of teeth 40 formed in the front face of the disc 29. A rack 41 meshes with the pinion 38 and is slidably positioned in aligned openings in the partition 12 and head of the cup shaped member 36. A flexible push and pull cable 42 is connected to this rack 41.

The steering wheel mechanism W includes a column 43 around which is slidably positioned a collar 44. One end of the push-pull cable 42 is connected to this collar as shown at 45. The collar 44 is formed with a cam slot 46. A shaft 47 is mounted within the column 43 and at its lower end carries an arm 48 which projects through a slot in the column 43 into the cam slot 46. The upper end of the shaft 47 carries an arm 49 which cooperates with indicia shown at 50 for indicating the speed at which the device is set.

A flasher bulb 51 is positioned in a slot 52 formed in the partition 12. A wire 53 extends from the flasher bulb to a flasher circuit to be later described. It suffices to note at this point that when the car is being driven the flasher bulb 51 flashes on and off intermittently, and this bulb will preferably be of a noticeable color such as red.

*Operation.—Figures 1 and 2*

The operator of the car first avails of the arm 49 as a means for adjusting the mechanism to some particular speed, this speed being shown on the indicia 50. As the arm 49 is rotated, it causes a corresponding rotation of the shaft 47, which in turn rotates the arm 48. As the latter extends into the cam slot 46 this rotation will cause a rectilinear movement of the collar 44. This is transmitted to the push-pull cable 42 to actuate the rack 41. The latter through the pinion 38 and gear 39 will cause the disc 29 to be rotated to the degree necessary to properly position the arcuate slot 31.

As the car is being driven, and if the speed to which the mechanism has been set is not exceeded, the disc 29 masks off the flashing light which ordinarily would be visible through the opening 25. However, as the speed of the car increases the dial 22 is turned and at that point where the opening 25 comes in alignment with the slot 31, the flashing light becomes visible to the driver of the car. He is thereby notified that the speed for which he has set the device is being exceeded. It is notable that the slot 31 is fairly extensive so as to render the device operative over a wide range above the set speed. This is important from the practical viewpoint, as it insures that the signal will be effective even though the set speed is exceeeded by a wide margin.

Figure 3:
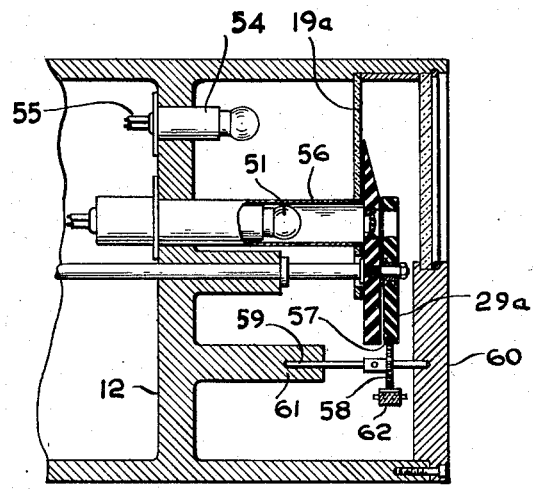
Figure 3 is a section through a slightly modified form of the invention.

*Modification.—Figures 3 and 4*

Figures 3 and 4 develop a slightly modified form of the invention. In this form it is important that the gauge face 19a be of a semi-transparent material. Immediately back of this face there is an ordinary light bulb 54 which is mounted in the partition 12 and which serves to illuminate the dial under conditions of night driving. Wires shown at 55 connect this bulb 54 with the circuit which ordinarily controls lighting of the instruments. This will be explained hereinafter in detail.

It is important to note that the bulb 54 should be of the usual white light, while the bulb 51 is red or another contrasting color. When both lights are included it will be preferable to provide a cylindrical shield 56 which extends from the opening 20 to a point behind the bulb 51.

A slightly modified form of drive for the disc 29 is also illustrated. In Figure 3 the disc 29a is shown as formed on its peripheral surface with gear teeth at 57. A gear 58 meshes with these teeth and is mounted on a shaft 59 that is journaled in a front wall 60 and an extension 61 carried by the partition 12. A rack 62 is shown as coming in from the side and engaging the gear 58. This rack 62 may be connected to the push-pull cable 42 and operated in the manner above described.

Figure 5:
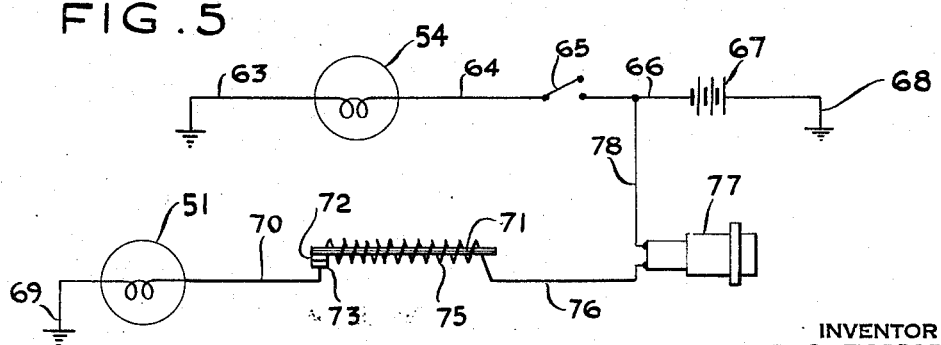
Figure 5 is a wiring diagram which develops the wiring system for the flasher circuit.

Referring now more particularly to Figure 5, the wiring diagram which is applicable to both forms of the invention will be described. The light bulb 54 is shown as being connected by a wire 63 to the ground which, of course, will be the framework of the vehicle. At the other side it is connected by a line 64 to a switch 65, and from the other side of this switch by a line 66 to a battery 67 which is in turn grounded as shown at 68.

The switch 65 is intended to represent the switch ordinarily included in a car for turning on the instrument lights, thus when the other instruments are lit up, so will the semi-transparent dial 19a be illuminated. This will enable the driver to view the speedometer in the usual way under conditions of night driving.

The red bulb 51 is shown as being grounded to the vehicle framework at 69. From the bulb 51 a line 70 extends to a breaker arm 71. The free end of the latter carries a contact 72 which cooperates with the complemental contact 73. A coil 75 is connected to the contact 72 at one end and at the other by a line 76 to an ignition switch shown at 77. This coil encircles the arm 71 as illustrated. A line 78 is tapped into the line 66 and is connected to the other side of the ignition switch.

It is evident that when the switch 77 is turned on the circuit will be effective to cause the light 51 to flash on and off.

While preferred specific embodiments of the invention are hereinbefore set forth, it is to be clearly understood that the invention is not to be limited to the exact constructions illustrated and described, because various modifications of these details may be provided in putting the invention into practice within the purview of the appended claims.

What is claimed is:

1. A speed indicator comprising a casing open at one end, a dial adjacent said end of the casing, a rotatable index arm overlying the dial and having a light transmitting opening therein, speedometer mechanism to rotate the index arm, a light source in the casing to transmit light through the opening, and an opaque disc overlying the index arm and formed with an arcuate slot concentric with the axis of the index arm and spaced the same distance therefrom as the opening to register with the opening in certain relative angular positions of the index arm and the disc so that the light source will be visible through said end of the casing.

2. A speed indicator comprising a casing open at one end, a dial adjacent said end of the casing, a rotatable index arm overlying the dial and having a light transmitting opening therein, speedometer mechanism to rotate the index arm, a light source in the casing to transmit light through the opening, an opaque disc overlying the index arm and formed with an arcuate slot concentric with the axis of the index arm and spaced the same distance therefrom as the opening to register with the opening in certain relative angular positions of the index arm and the disc so that the light source will be visible through said end of the casing, said disc being rotatable in the casing, and remotely operable means to turn the disc.

3. A speed indicator comprising a casing open at one end, a dial adjacent said end of the casing, a rotatable index arm overlying the dial and having a light transmitting opening therein, speedometer mechanism to rotate the index arm, a light source in the casing to transmit light through the opening, an opaque disc overlying the index arm and formed with an arcuate slot concentric with the axis of the index arm and spaced the same distance therefrom as the opening to register with the opening in certain relative angular positions of the index arm and the disc so that the light source will be visible through said end of the casing, said disc being rotatable in the casing, and means including a push-pull cable operable from a remote point to turn the disc.

4. A speed indicator comprising a casing open at one end, a dial in the casing adjacent said end, a rotatable index arm overlying the dial and having a light transmitting opening therein, speedometer mechanism to rotate the index arm, the dial having an arcuate slot therein concentric with the axis of the index arm and spaced the same distance therefrom as the opening, a light shield back of the dial registering with the slot, a light source in the shield to project light through the slot and opening, and an opaque disc overlying the index arm and formed with an arcuate slot concentric with the axis of the index arm and spaced therefrom the same distance as the opening to register with the opening in certain relative angular positions of the index arm and the disc so that the light source will be visible through said end of the casing.

5. A speed indicator comprising a casing open at one end, a dial in the casing adjacent said end, a rotatable index arm overlying the dial and having a light transmitting opening therein, speedometer mechanism to rotate the index arm, the dial having an arcuate slot therein concentric with the axis of the idex arm and spaced the same distance therefrom as the opening, a light shield back of the dial registering with the slot, a light source in the shield to project light through the slot and opening, an opeque disc overlying the index arm and formed with an arcuate slot concentric with the axis of the index arm and spaced therefrom the same distance as the opening to register with the opening in certain relative angular positions of the index arm and the disc so that the light source will be visible through said end of the casing, the disc being rotatably mounted in the casing, and remotely operable means to turn the disc.

LEE S. TREESE.

(References on following page)

REFERENCES CITED

The following references are of record in the file of this patent:

UNITED STATES PATENTS

| Number | Name | Date |
|---|---|---|
| 1,629,680 | Cooke | May 24, 1927 |
| 1,785,397 | Shoenberg | Dec. 16, 1930 |
| 2,088,326 | Klopfer | July 27, 1937 |
| 2,108,342 | Le Fevre | Feb. 15, 1938 |
| 2,111,284 | Girl | Mar. 14, 1938 |
| 2,165,498 | Moody | July 11, 1939 |
| 2,261,770 | Kusinitz | Nov. 4, 1941 |
| 2,297,233 | Meer | Sept. 29, 1942 |
| 2,346,108 | Kendall | Apr. 4, 1944 |

FOREIGN PATENTS

| Number | Country | Date |
|---|---|---|
| 345,296 | Great Britain | Mar. 16, 1931 |